(12) United States Patent
Yamanishi

(10) Patent No.: US 10,367,953 B2
(45) Date of Patent: *Jul. 30, 2019

(54) IMAGE PROCESSING DEVICE WITH DESTINATION SELECTION INTERFACE

(71) Applicants: KABUSHIKI KAISHA TOSHIBA, Tokyo (JP); TOSHIBA TEC KABUSHIKI KAISHA, Tokyo (JP)

(72) Inventor: Hitoshi Yamanishi, Susono Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/941,658

(22) Filed: Mar. 30, 2018

(65) Prior Publication Data

US 2018/0227442 A1 Aug. 9, 2018

Related U.S. Application Data

(63) Continuation of application No. 15/244,696, filed on Aug. 23, 2016, now Pat. No. 10,063,718.

(30) Foreign Application Priority Data

Dec. 24, 2015 (JP) .................................. 2015-251297

(51) Int. Cl.
G06F 3/12 (2006.01)
H04N 1/00 (2006.01)
G06F 3/0482 (2013.01)

(52) U.S. Cl.
CPC ....... H04N 1/00209 (2013.01); G06F 3/0482 (2013.01); H04N 1/0035 (2013.01);
(Continued)

(58) Field of Classification Search
CPC ............. H04N 1/00209; H04N 1/0035; H04N 1/00405; H04N 1/00408; H04N 1/00413;
(Continued)

(56) References Cited

U.S. PATENT DOCUMENTS 6,418,426 B1 7/2002 Schlesinger
7,552,185 B1 6/2009 Kirzner et al.
(Continued)

FOREIGN PATENT DOCUMENTS

JP H09-114756 A 5/1997
JP 2007-251506 A 9/2007
JP 2015-216553 A 12/2015

OTHER PUBLICATIONS

Extended European Search Report filed May 18, 2017 in counterpart European Patent Application No. 16204761.7 (14 pages).

*Primary Examiner* — Gabriel I Garcia
(74) *Attorney, Agent, or Firm* — Kim & Stewart LLP

(57) ABSTRACT

An image processing device according to an embodiment includes a display unit that displays a FAX destination registration screen having a destination registration region and a destination input region in which a plurality of selectable FAX destinations are displayed. An input unit configured receives a destination registration input with respect to the destination input region, the destination registration input indicating a selected FAX destination from the plurality of selectable FAX destinations. The input unit also receives a transmission input. In response to the destination registration input, a control unit controls the display unit to display a plurality of FAX destinations, including the selected FAX destination, in the destination registration region. In response to the transmission input, the control unit transmits an image to each FAX destination displayed in the destination registration region.

16 Claims, 7 Drawing Sheets

(52) U.S. Cl.
CPC ..... *H04N 1/00405* (2013.01); *H04N 1/00408* (2013.01); *H04N 1/00411* (2013.01); *H04N 1/00413* (2013.01); *H04N 1/00472* (2013.01); *H04N 2201/0094* (2013.01)

(58) Field of Classification Search
CPC ........... H04N 1/00411; H04N 1/00472; H04N 2201/0094; G06F 3/0482
USPC ................................ 358/1.1–1.18, 402, 474
See application file for complete search history.

(56) References Cited

U.S. PATENT DOCUMENTS

| | | |
|---|---|---|
| 9,294,647 B2* | 3/2016 | Yamada .................... G06F 9/50 |
| 2001/0029521 A1 | 10/2001 | Matsuda et al. |
| 2004/0073606 A1 | 4/2004 | Verma et al. |
| 2007/0177194 A1 | 8/2007 | Yamaguchi |
| 2009/0094694 A1 | 4/2009 | Kodaira |
| 2013/0120785 A1* | 5/2013 | Terao .................... G06K 15/02 |
| | | 358/1.14 |
| 2013/0128308 A1 | 5/2013 | Nishiyama |
| 2014/0169540 A1 | 6/2014 | Suga et al. |
| 2015/0281495 A1 | 10/2015 | Kamoi |
| 2015/0296097 A1 | 10/2015 | Kawashima |

\* cited by examiner

IMAGE PROCESSING DEVICE WITH DESTINATION SELECTION INTERFACE

CROSS-REFERENCE TO RELATED APPLICATIONS

This application is a continuation of U.S. patent application Ser. No. 15/244,696, filed on Aug. 23, 2016, which is based upon and claims the benefit of priority from Japanese Patent Application No. 2015-251297, filed on Dec. 24, 2015, the entire contents of each of which are incorporated herein by reference.

FIELD

Embodiments described herein relate generally to an image processing device.

BACKGROUND

Generally, an image processing device such as a digital multi-functional peripheral or the like performs image processing and provides the images to destinations such as by FAX and email, based on input provided through a display unit to which a touch panel is attached. The digital multi-functional peripheral displays the registered destination when a destination confirmation button is pressed before transmission. However, in the digital multi-functional peripheral, there is a problem that the registered destination cannot be displayed if the destination confirmation button is not pressed.

DETAILED DESCRIPTION

An image processing device according to an embodiment includes a display unit configured to display an image destination registration screen having a destination registration region and a destination input region in which a plurality of selectable image destinations are displayed. An input unit receives a destination registration input with respect to the destination input region, the destination registration input indicating a selection of one image destination from the plurality of selectable image destinations. The input unit also receives a transmission input. A control unit controls the display unit to display the selected image destination in the destination registration region in response to the destination registration input. In response to the transmission input, the control unit transmits an image to each image destination displayed in the destination registration region.

An image processing device according to another embodiment includes a display unit that displays a FAX destination registration screen having a destination registration region and a destination input region in which a plurality of selectable FAX destinations are displayed. An input unit configured receives a destination registration input with respect to the destination input region, the destination registration input indicating a selected FAX destination from the plurality of selectable FAX destinations. The input unit also receives a transmission input. In response to the destination registration input, a control unit controls the display unit to display a plurality of FAX destinations, including the selected FAX destination, in the destination registration region. In response to the transmission input, the control unit transmits an image to each FAX destination displayed in the destination registration region.

Hereinafter, an embodiment will be described with reference to drawings in detail.

First, a configuration of a digital multi-functional peripheral (MFP) 1 as an image processing device will be described.

Figure 1:
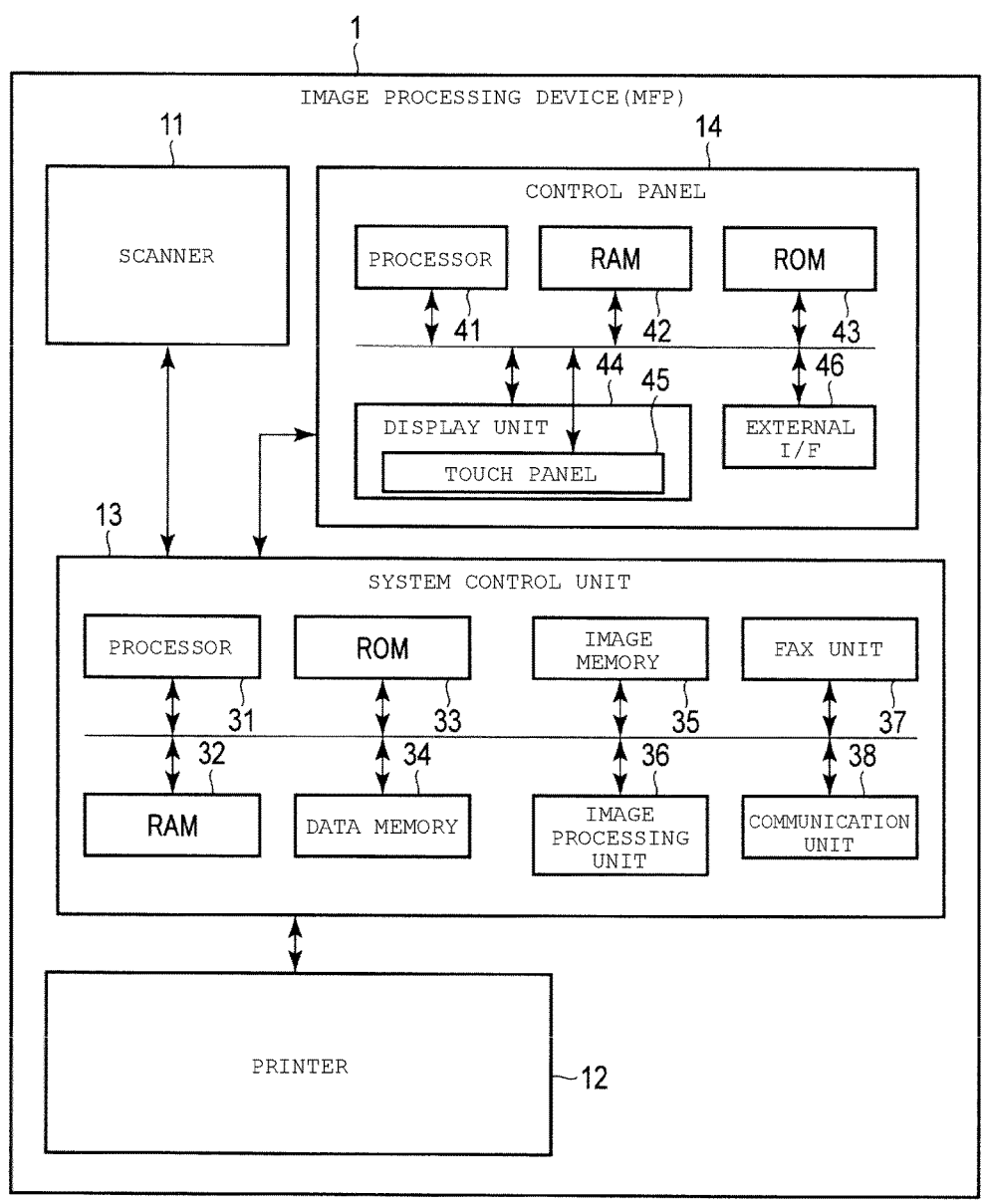
FIG. 1 is a block diagram schematically illustrating an example configuration of an image processing device according to an embodiment.

FIG. 1 is a block diagram illustrating an example configuration of the MFP 1.

In the configuration example illustrated in FIG. 1, the MFP 1 includes a scanner 11, a printer 12, a system control unit 13, and a control panel 14. In addition, the scanner 11, the printer 12, and the control panel 14 are connected to the system control unit 13.

The scanner 11 is a device that converts an image of a document into image data by optically reading the image. The scanner 11 performs scanning of the document according to an operation command from the system control unit 13. The scanner 11 outputs the image data of the document that is read to the system control unit 13.

The printer 12 forms an image on a target image recording medium such as a sheet. The printer 12 prints the image on the sheet based on the image data supplied from the system control unit 13, under various print conditions designated by the system control unit 13. As the printer 12, printers using various image forming methods can be applied. For example, the printer 12 maybe a printer of an electrophotographic type, or maybe an inkjet type, a thermal transfer type, or the like.

The system control unit 13 controls the entirety of the MFP 1. The system control unit 13 is connected to each unit of the MFP 1. The system control unit 13 communicates with the scanner 11, the printer 12, and the control panel 14 in a bi-directional manner. The system control unit 13 controls operations of each unit of the scanner 11, the printer 12, the control panel 14, or the like. In addition, the system control unit 13 performs various types of processing such as image processing or the like.

The system control unit 13 includes a processor 31, a RAM 32, a ROM 33, a data memory 34, an image memory 35, an image processing unit 36, a FAX unit 37, a communication unit 38, and the like. The processor 31, the RAM 32, the ROM 33, and the data memory 34 function as a processing unit that controls each unit and performs the various processing.

The processor 31 functions as a control unit. The processor 31 performs operational processing according to a program. For example, the processor 31 may be a CPU. The processor 31 achieves various processing functions by executing programs stored in the ROM 33 or the data memory 34. The RAM 32 is a working memory. The RAM 32, for example, is a volatile memory. The RAM 32 reads programs to be executed or functions as a buffer memory. The ROM 33 is a program memory. The ROM 33, for example, is a non-volatile memory. The ROM 33 stores a specific program, setting data, or the like of the MFP 1.

The data memory 34 stores control data, a control program, setting information, or the like. The data memory 34, for example, is a rewritable non-volatile memory. The data memory 34, for example, also stores default setting values or the like for various operation modes. In addition, the data memory 34 includes an address book 34a for storing destination information such as a FAX number, an email address, or the like corresponding to destination name, ID, or the like. In addition, the address book 34a saves a destination that is frequently used as a favorite. In addition, the address book 34a may be provided for each user, may be provided for each MFP, or may be provided for each group.

The address book 34a may be stored in a memory of an external device which can be communicated with the MFP 1. For example, the address book 34a may be provided in a memory of a server device in communication with the communication unit 38, or may be provided in a memory of another MFP in communication with the communication unit 38.

The image memory 35 includes a hard disk drive, a page memory, or the like. The image memory 35 stores the image data. The image processing unit 36 performs image processing with respect to the image data.

The FAX unit 37 is a FAX interface for performing facsimile communication. The FAX unit 37 transmits facsimile data to a FAX number destination that is set by the processor 31. The communication unit 38 is a network interface for performing data communication with an external device, through a network such as the Internet or the like. The communication unit 38 transmits data to a destination set by the processor 31.

The control panel 14 is a user interface. The control panel 14 displays a guide with respect to users, or receives an operation selection from users. In the example illustrated in FIG. 1, the control panel 14 includes a processor 41, a RAM 42, a ROM 43, a display unit 44, a touch panel 45, and an external interface (I/F) 46.

The processor 41 controls the control panel 14. The processor 41 is an integrated circuit for executing programs. The processor 41, for example, is a CPU. The processor 41 achieves various processing functions by executing programs stored in the ROM 43. The processor 41 communicates information from the control panel 14 to the system control unit 13. In addition, the processor 41 controls each section of the control panel 14 according to a control signal from the system control unit 13.

The RAM 42 is a working memory. For example, the RAM 42 is a volatile memory. The ROM 43 is a non-volatile program memory. The ROM 43 may update a program, control data, setting information, display data, or the like by a rewritable non-volatile memory.

The display unit 44 displays an operation screen, such as an operation guide, or the like. For example, the display unit 44 is a liquid crystal display device. The display unit 44 includes the touch panel 45 on a display screen. The touch panel 45 functions as an input unit. The touch panel 45 detects a portion at which a user is touched on the display screen of the display unit 44. The touch panel 45 supplies information indicating a position touched by users as a detection signal to the processor 41.

The processor 41 controls a screen displayed on the display unit 44. The processor 41 displays various operation screens on the display unit 44 according to a command from the system control unit 13. In addition, the processor 41 identifies a position that is input (touched) by users on the display screen of the display unit 44 according to a detection signal by the touch panel 45. For example, the processor 41 identifies a button (icon) selected as input by users based on a display position of an icon displayed on the display unit 44 and a touch position of users detected by the touch panel 45. The processor 41 communicates information indicating an instruction that is detected to the processor 31 of the system control unit 13. In addition, the processor 41 may detect the content of an instruction according to a touch operation (touch state such as a movement distance, a movement speed, or the like of touch position) on the display screen by a user detected by the touch panel 45.

An external I/F 46 is an interface for communicating with an external device. The external I/F 46 can be configured as an interface in compliance with a general purpose standard such as a universal serial bus (USB) or the like. For example, the external I/F 46 is connected to a portable storage device. In addition, the external I/F 46 may be connected to a numeric keypad, a portable keyboard, or the like.

The control panel 14 may include physical buttons. For example, the control panel 14 may include a button for selecting processing such as numeric keypad processing, scanning processing, and the like.

Next, an example of the operation screen displayed on the display unit 44 of the control panel 14 of the MFP 1 according to the embodiment will be described.

First, a destination setting screen for FAX will be described.

Figure 2:
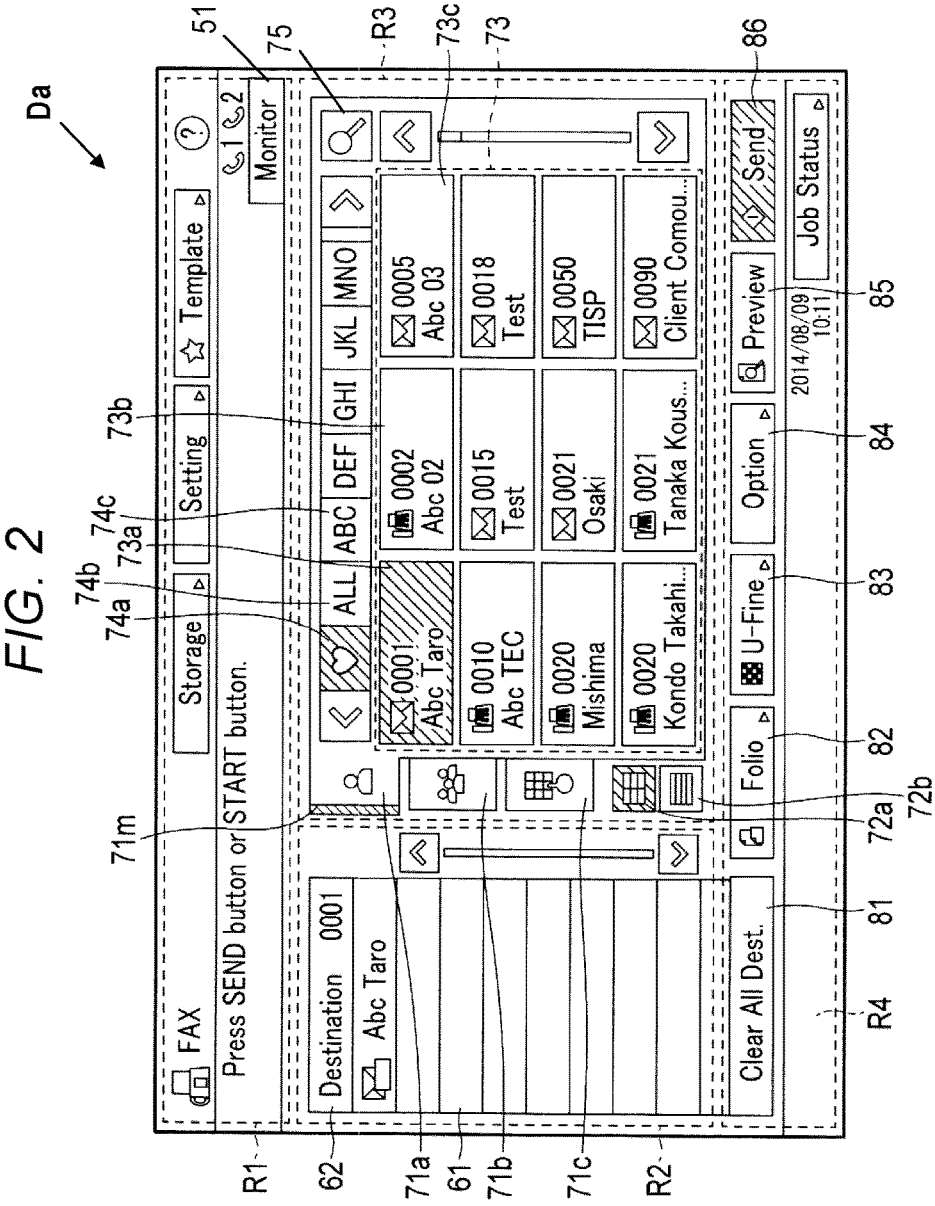
FIG. 2 is an example of a destination setting screen for FAX displayed by the image processing device.

FIG. 2 is an example of a destination setting screen Da for FAX processing displayed on the display unit 44 in a FAX mode of the MFP 1.

In the FAX mode, the destination setting screen Da is an operation screen for setting a transmission destination of facsimile data. The destination setting screen Da includes a guide display region R1, a destination display region R2, a destination input region R3, and an operation button region R4. The guide display region R1 is an upper portion of the destination setting screen Da displayed on the display unit 44. The destination display region R2 is a left side region of the destination setting screen Da. The destination input region R3 is a right side region of the destination setting screen Da. The operation button region R4 is a lower portion region of the display region in the display region of the destination setting screen Da.

The guide display region R1 displays the operation guide. The guide display region R1 may display an operation button or the like, in addition to the display of the operation guide. For example, a monitor button 51 is displayed in the guide display region R1. The monitor button 51 is a button for selecting the on-hook transmission of FAX.

The destination display region R2 displays information indicating registered destinations. A registration field 61 and a display field 62 in are included the destination display region R2. The registration field 61 displays the registered destination. For example, the registration field 61 lists information indicating the registered destination in a list format. The registration field 61 updates the display according to registration and deletion of the destinations. Each of destinations displayed in the registration field 61 can be selected by, for example, touching a portion of the display.

In addition, display content of the registration field 61 is changed according to an operation of the scroll key. The display field 62 displays the number of the registered destinations. The display of the display field 62 is updated according to the increment or decrement of the number of the registered destinations.

The destination input region R3 displays an operation screen for selecting the destinations. The destination input region R3 displays any one of a button (icon) format destination selection screen, a list format destination selection screen, or a number input screen. A screen displayed on the destination input region R3 will be described below in detail.

The operation button region R4 displays various operation buttons. In an example illustrated in FIG. 2, the operation button region R4 displays a clear all destinations button 81, a size button 82, a resolution button 83, an option button 84, a preview button 85, and a transmission button 86.

The clear all destinations (Clear All Dest.) button 81 is a button for selecting to clear all of the registered destinations. The size (Folio) button 82 is a button for selecting the size of print medium. The resolution (U-Fine) button 83 is a button for selecting the resolution of an image. The option (Option) button 84 is a button for selecting option settings. The preview (Preview) button 85 is a button for selecting a preview display of an image. The transmission (Send) button 86 is a button for selecting the start of transmission processing. The transmission button 86 is displayed in a selectable state when at least one destination is set.

In an example illustrated in FIG. 2, the destination input region R3 displays three tabs 71a, 71b, and 71c for selecting display screens, a mark 71m, selection buttons 72a and 72c, an input field 73, destination buttons 73a, 73b, 73c, . . . , condition tabs 74a, 74b, 74c, a search button 75, or the like.

The three tabs 71a, 71b, and 71c are buttons for selecting input screens for inputting destinations. The first tab 71a is a tab key for selecting to display a destination selection screen on an individual person basis. The second tab 71b is a tab key for selecting to display the destination selection screen on a group basis. The third tab 71c is a tab key for selecting to display a direct input screen (number input screen) for directly inputting a FAX number destination. The mark 71m indicates which tab is selected from the three tabs 71a, 71b, and 71c. In the example illustrated in FIG. 2, the mark 71m is displayed on the first tab 71a, and indicates that the first tab 71a is selected.

The selection button 72a and the selection button 72b are displayed when the first tab 71a or the second tab 71b is in a selection state. The selection button 72a is a button for selecting to display the destination selection screen in a button (icon) format. The selection button 72b is a button for selecting the display of the destination selection screen on a list format. Here, the destination setting screen Da in a case where the first tab 71a is selected will be described, with reference to FIG. 2. The destination setting screen in a case where the second tab 71b is selected can be achieved with the same configuration as the destination setting screen when the first tab 71a is selected, except that destinations are set on a group basis instead of an individual basis.

The destination buttons (icon) 73a, 73b, 73c corresponding to each destination are arranged in the input field 73 of the destination selection screen of a button format illustrated in FIG. 2. The input field 73 is a region in which the destination buttons 73a, 73b, 73c are arranged in a display pattern. The destination buttons 73a, 73b, 73c arranged in the input field 73 correspond to destinations registered in the address book 34a, respectively. Information (for example, destination name) indicating the destinations is displayed in each of the destination buttons 73a, 73b, 73c.

Each of the destination buttons 73a, 73b, and 73c can be selected by the touch panel 45. A display state of each of the destination button 73a, 73b, 73c is changed for each touch (selection). For example, each of the destination buttons 73a, 73b, and 73c is displayed in a display state indicating any one of a selection state and a non-selection state. When the destination buttons 73a, 73b, 73c of the non-selection state are touched (selected) by a user, a display state becomes a selection state (for example, display of reversed display or predetermined color). In addition, a state of a destination corresponding to the destination button in the selection state becomes a registered state (registered), and the registered state is displayed on the destination display region R2. In addition, in response to a user selection, a state of the display state of the destination buttons 73a, 73b, 73c in the selection state becomes the non-selection state. A destination corresponding to a destination button in the non-selection state is deleted from the registered destination list, and deleted from the display of the destination display region R2.

In addition, the destination selection screen illustrated in FIG. 2 includes condition tabs 74a, 74b, 74c for narrowing a search range of a destination actually displayed in the destination input region R3. The condition tab 74a is a tab key for selecting the display of a destination button of one or more destinations that are set as frequently used (favorite). In addition, when the condition tab 74a is selected, a display order of each destination that is set as the favorite may be set by a user. For example, a button of each destination may be displayed in the order which is set in advance by a user, may be displayed in order of highest frequency of use, or may be displayed in order of most recently used.

The condition tab 74b is a tab key for selecting the display of a destination button of each destination name registered in the address book 34a to be arranged in alphabetical order. In addition, when the condition tab 74b is selected, buttons of the entirety of destinations in ID (ID number) order registered in the address book 34a may be displayed in a region R3. The condition tab 74c and subsequent tabs are tab keys for selecting the narrowing of a search range of a destination button displayed by an initial of the destination name registered in the address book 34a. For example, when the condition tab 74c displayed as "ABC" is selected, a destination button corresponding to a destination in which the first letter of the destination name is "A", "B", or "C" is displayed.

Furthermore, a search button 75 is displayed in the destination input region R3 illustrated in FIG. 2. The search button 75 is a button for selecting a condition input to narrow (search) a search range of a destination that is displayed. When the search button 75 is selected, an input screen of a search condition is displayed in the destination setting screen Da. After the search of the destination in the search condition that is input is performed in the input screen of a search condition, a destination button of the destination in which the search condition is narrowed is displayed in the input field 73 of the destination input region R3.

In addition, when the selection button 72b is selected, the destination selection screen is displayed in the destination input region R3 in list format. Information indicating a destination registered in an address book is displayed as a list in the destination selection screen. The list, for example, displays each destination in a table format. A display portion of each destination can be selected by the touch panel 45. A state of a display portion of a destination that is touched becomes a display (for example, reversed display or display of predetermined color) indicating a selection state. A destination button that is selected is displayed in a selected state and is registered as the destination, and the registered destination is added the destination display region R2. In addition, when a destination button in the selection state is touched, a state of the destination button becomes a non-selection state. The destination displayed in the non-selection state is deleted from the registered destination list, and is also deleted from the display of the destination display region R2. In addition, the same condition tabs 74a, 74b, 74c for narrowing a destination displayed as the list in the destination input region R3 are also displayed, even in the destination selection screen of the list format.

Next, a destination setting screen for email transmission will be described.

Figure 3:
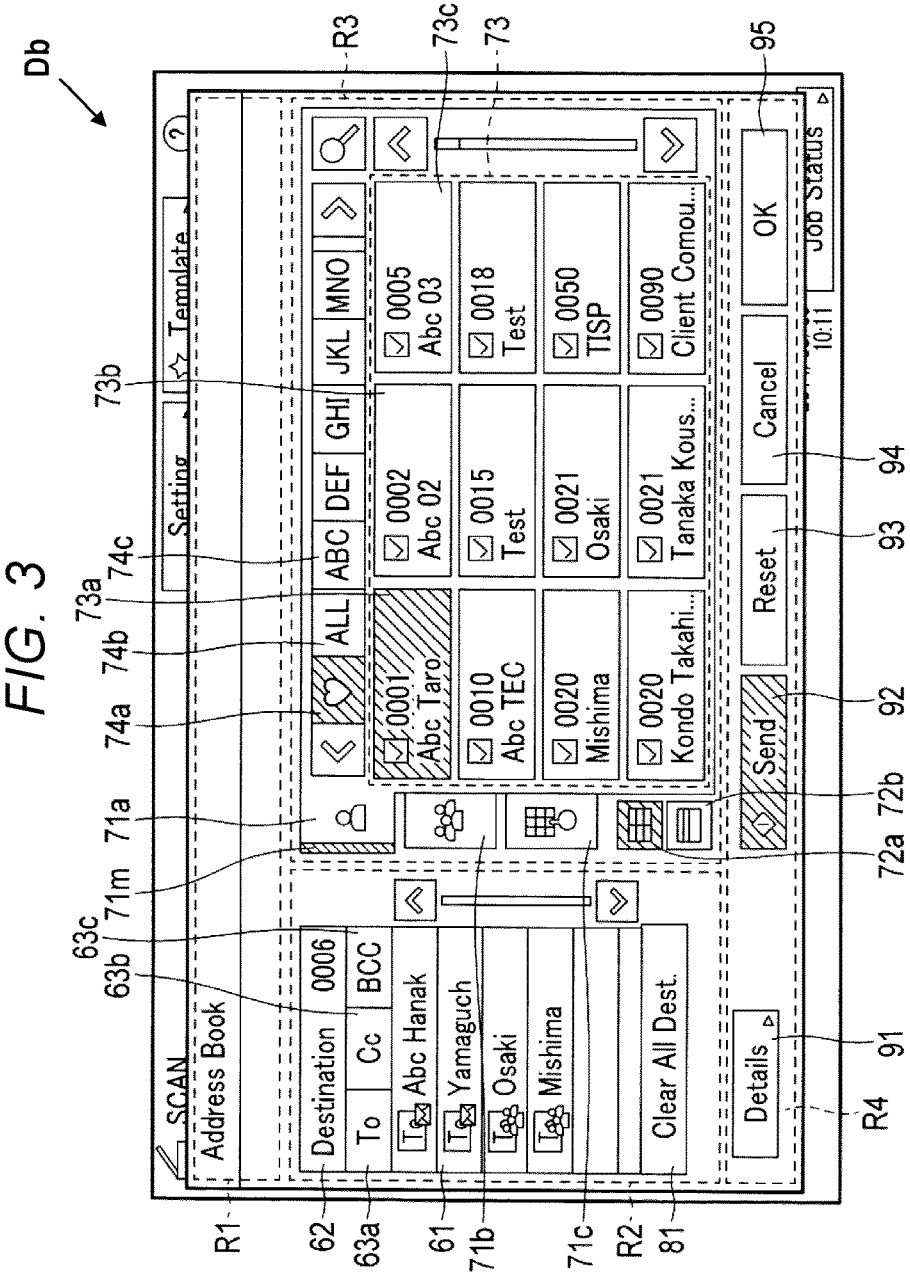
FIG. 3 is an example of a destination setting screen for email displayed by the image processing device.

FIG. 3 an example of a destination setting screen Db for email displayed by the display unit 44 of the MFP 1.

The destination setting screen Db illustrated in FIG. 3 is an operation screen for setting a destination, in a function of scanning to email. The destination setting screen illustrated in FIG. 3 includes the guide display region R1, the destination display region R2, the destination input region R3, and the operation button region R4. The guide display region R1 is an upper region of the display unit 44. The destination display region R2 is a left side region of the display unit 44. The destination input region R3 is a right side region of the display unit 44. The operation button region R4 is a lower region of the display unit 44.

The operation guide is displayed in the guide display region R1. Information indicating a registered (selected) destination is displayed in the destination display region R2. The operation screen for selecting a destination is displayed in the destination input region R3. The destination selection screen may be displayed in a button (icon) format, a list format, or as a direct input screen in the destination input region R3.

In an example illustrated in FIG. 3, the destination display region R2 includes the registration field 61, the display field 62, a To tab 63a, a Cc tab 63b, a Bcc tab 63c, and a clear all destinations (Clear All Dest.) button 81. In addition, a mark is displayed in the tab selected from the To tab 63a, the Cc tab 63b, and the Bcc tab 63c. It is preferable that the mark of the selected tab is highlighted. The registered destination is displayed in the list format in the registration field 61. The total number of the registered destinations as a destination of To, Cc, and Bcc is displayed in the display field 62. In addition, the clear all destinations button 81 is a button for selecting the deletion of the entirety of destinations that are registered.

The To tab 63a, the Cc tab 63b, and the Bcc tab 63c are buttons for classifying the destinations according to operating rules of email for each category. A state of any one of the three tabs of the To tab 63a, the Cc tab 63b, and the Bcc tab 63c becomes a selection state in many cases.

The To tab 63a is a button for selecting the display of the destination registered as the main destination (hereinafter, referred to as the To destination) of a first category. When the To tab 63a is selected, the destination registered as a To destination is displayed in the registration field 61. When the To tab 63a is selected, the number of the destination registered in the To destination may be displayed in the display field 62. The Cc tab 63b is a button for selecting the display of the destination registered as the transmission destination (hereinafter, referred to as the Cc destination) of copy (carbon copy) of a second category. When the Cc tab 63b is selected, the destination registered in the Cc destination is displayed in the registration field 61. When the Cc tab 63b is selected, the number of destinations registered in the Cc destination may be displayed in the display field 62. The Bcc tab 63c is a button for selecting the display of the destination registered as the transmission destination (hereinafter, referred to as the Bcc destination) of non-disclosure copy (blind carbon copy) of a third category. When the Bcc tab 63c is selected, the destination registered in the Bcc destination is displayed in the registration field 61. When the Bcc tab 63c is selected, the number of destinations registered in the Bcc destination may be displayed in the display field 62.

Various operation buttons are displayed in the operation button region R4. In the example illustrated in FIG. 3, a detail information button 91, a transmission button 92, a reset button 93, a cancel button 94, and an OK button 95 are displayed. The detail information button 91 is a button for selecting the display of detailed information. The transmission button 92 is a button for selecting the start of email transmission to the registered destination(s). The transmission button 92 is displayed in a selectable state when at least one destination is set. The reset button 93 selects the reset of setting content. The cancel button 94 selects the termination of processing. The OK button 95 selects the completion of address setting.

Next, a case where a destination displayed in the registration field 61 is selected in the destination selection screen will be described.

Figure 4A:
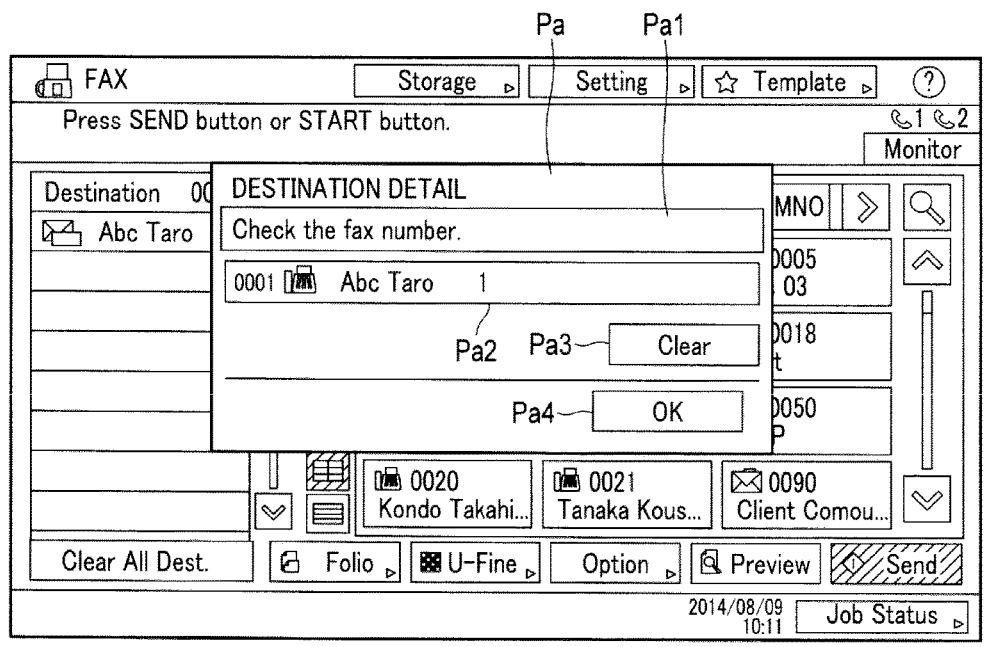
FIG. 4A is a first example of a pop-up screen displayed by the image processing device.
Figure 4B:
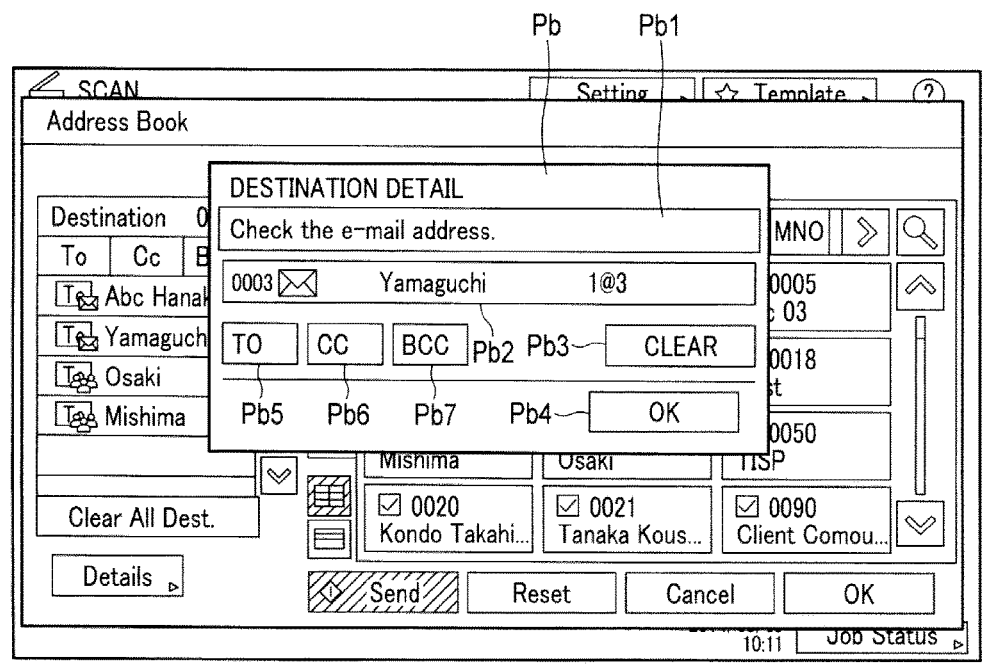
FIG. 4B is a second example of a pop-up screen displayed by the image processing device.

FIG. 4A and FIG. 4B are display examples of pop-up screens Pa and Pb displayed in a case where a destination displayed in the registration field 61 is selected.

FIG. 4A is an example of the pop-up screen Pa in the destination setting screen Da for FAX. FIG. 4B is an example of the pop-up screen Pb in the destination setting screen Db for email. The pop-up screens Pa and Pb are input screens for changing a state of a destination selected in the registration field 61. The pop-up screen Pa is displayed in a case where a destination displayed in the registration field 61 of the destination setting screen Da for FAX is touched. The pop-up screen Pb is displayed in a case where a destination displayed in the registration field 61 of the destination setting screen Db for email is touched.

In the example illustrated in FIG. 4A, the pop-up screen Pa includes a guide unit Pa1, a destination display unit Pa2, a clear button Pa3, and an OK button Pa4. The guide unit Pa1 displays the operation guide. The destination display unit Pa2 displays information indicating the destination that is selected. For example, the destination display unit Pa2 displays a destination name, a destination ID, a type icon indicating the type of destination, and the total number of the registered destinations. The clear button Pa3 selects the release of a registered state with respect to the destination. The OK button Pa4 is a button for selecting the closing of the pop-up screen Pa. When the pop-up screen Pa is closed, the display unit 44 displays the destination setting screen Da which reflects changes made via the pop-up screen Pa.

In addition, in the example illustrated in FIG. 4B, the pop-up screen Pb includes a guide unit Pb1, a destination display unit Pb2, a clear button Pb3, an OK button Pb4, a To button Pb5, a Cc button Pb6, and a Bcc button Pb7. The guide unit Pb1 displays the operation guide. The destination display unit Pb2 displays information indicating the destination that is selected. For example, the destination display unit Pb2 displays a destination name, a destination ID, a type icon indicating the type of destination, the total number of the registered destinations, or the like. The clear button Pb3 selects the release of a registered state of the destination. The OK button Pb4 is a button for selecting the closing of the pop-up screen Pb. In addition, when the pop-up screen Pb is closed, the display unit 44 displays the destination setting screen Db which reflects changes made via the pop-up screen.

The To button Pb5, the Cc button Pb6, and the Bcc button Pb7 are buttons for selecting the change or addition of a category of a destination. The To button Pb5 is a button for selecting the change or addition to the To destination field. The Cc button Pb6 is a button for selecting the change or addition to the Cc destination field. The Bcc button Pb7 is a button for selecting the change or addition to the Bcc destination field. The same button as the category that is currently registered in the destination among the To button Pb5, the Cc button Pb6, and the Bcc button Pb7 may be displayed in a state that cannot be selected. For example, when a destination displayed on the destination display unit Pb2 is in a state registered in the destination of To, the To button Pb5 may be displayed (or not displayed) in a state that cannot be selected.

In addition, when a destination displayed in the registration field 61 is selected, a display position of the selected destination may be changed in the input field 73.

Figure 5B:
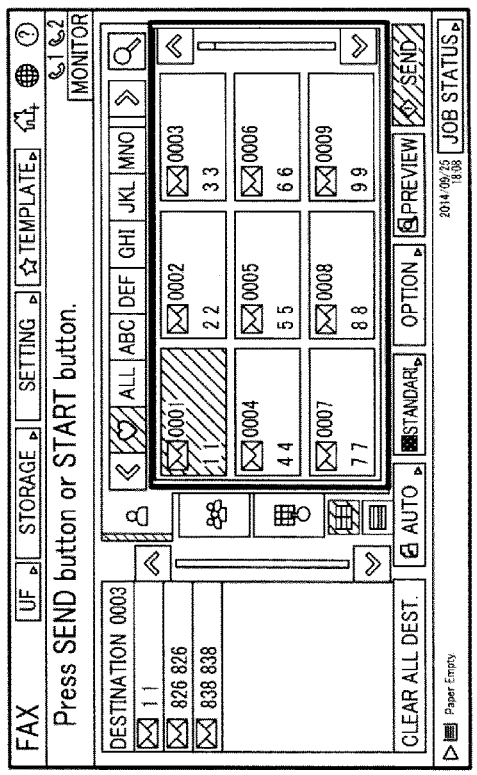
FIGS. 5A and 5B illustrate transition of the destination setting screen displayed by the image processing device.
Figure 5A:
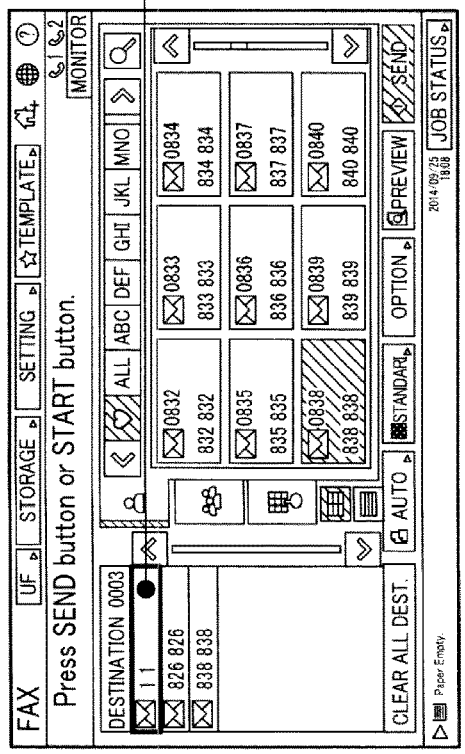

FIG. 5A and FIG. 5B are display examples indicating transition of a display state in the destination setting screen.

FIG. 5A is a diagram illustrating one destination selected in the registration field 61 of the destination setting screen for FAX. FIG. 5B is a diagram illustrating a display state of the destination setting screen for FAX after the destination illustrated in FIG. 5A is selected.

In examples illustrated in FIG. 5A and FIG. 5B, when a destination displayed in the registration field 61 is selected in the destination setting screen, a display position is changed in the input field of the selected destination. FIG. 5A illustrates that the destination displayed in the registration field 61 is touched. FIG. 5B illustrates a state where a display position is moved in the input field 73 of a destination button corresponding to the destination touched (selected) in the registration field 61. In the example illustrated in FIG. 5B, a state where a destination button corresponding to the selected destination in the registration field 61 is moved to a left upper display position in the input field 73 is displayed. In addition, in the input field 73, the destination button of the selected destination may be moved to a predetermined display position, without changing arrangement order of destination buttons. In addition, in the input field 73, only the destination button of the selected destination may be moved to a predetermined display position.

That is, the MFP 1 according to the embodiment moves a display position of a destination button (or display portion of destination in list) in the destination input region R3, according to a selection of a destination in the destination display region R2. When a destination button corresponding to the selected destination in the registration field 61 can move to a position that is easily recognized in the input field, the operability of users is improved. For example, when a right upper portion of the input field 73 is a display position that is easily recognized, the destination button of the destination selected in the registration field is displayed on the right upper portion of the input field 73, and then the operability is improved.

Also, in the destination selection screen for email, in the same manner as described above, a display position of the destination button (or display portion of destination in list) of the destination selected in the registration field 61 may be changed. In addition, in the destination selection screen, the pop-up screen Pb may be moved to a display position of the destination button (or display portion of destination in list), and the pop-up screen Pb may be displayed at the same time.

Next, an operation in the FAX mode of the MFP 1 will be described.

Figure 6:
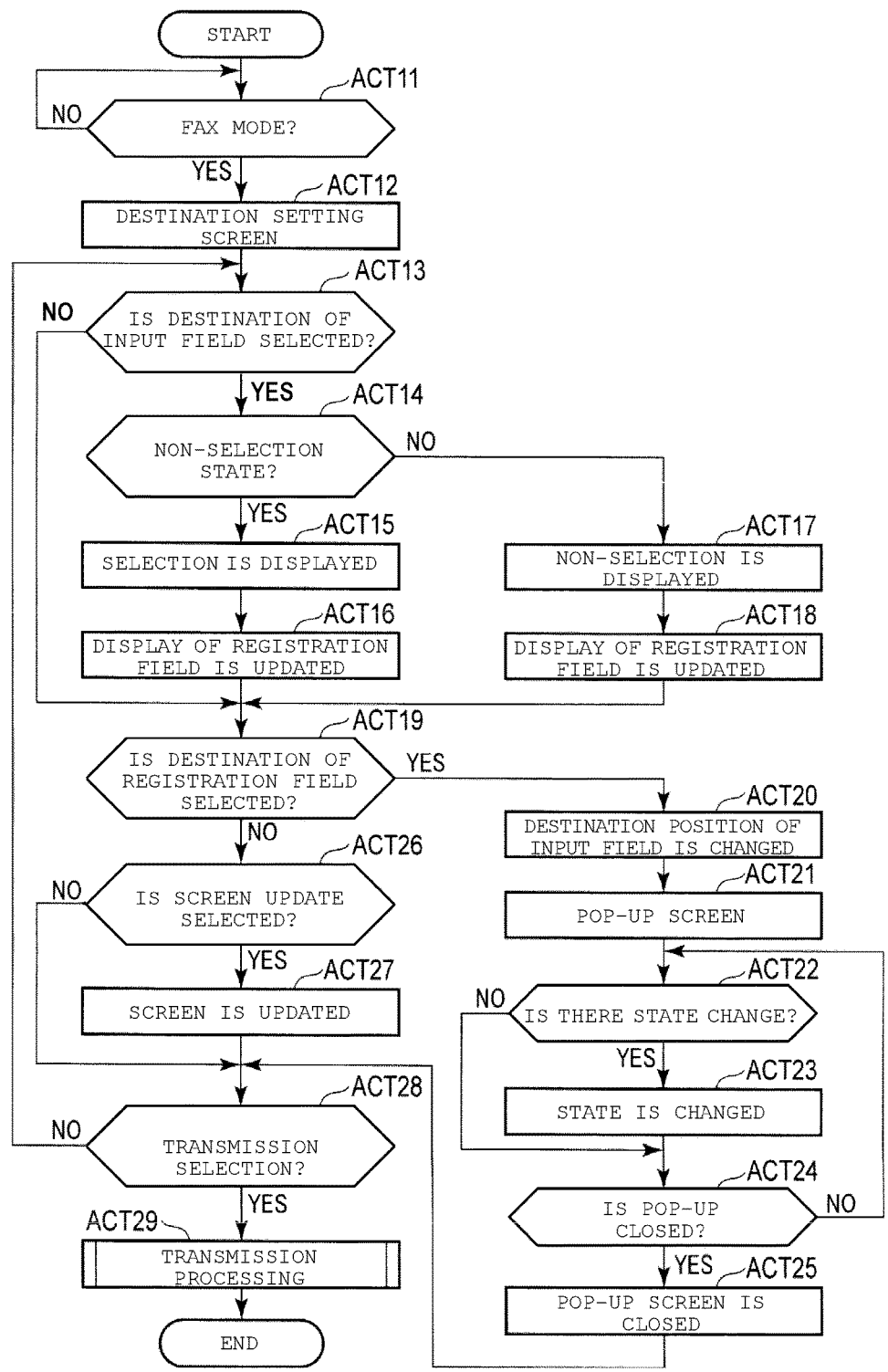
FIG. 6 is a flowchart illustrating an example sequence of operations for FAX processing in the image processing device.

FIG. 6 is a flowchart illustrating an example sequence of operations including destination setting processing in the FAX mode of the MFP 1.

The processor 31 of the system control unit 13 displays a main menu screen on the display unit 44 of the control panel 14 in a standby state. The main menu screen is an operation screen that can select various processing modes including the FAX mode. When the FAX mode is designated (ACT 11, YES), the processor 31 displays a destination setting screen for setting a destination of FAX on the display unit 44 (ACT 12). When the FAX mode is selected, an initial screen is displayed first. As an example, a case that the destination setting screen Da for FAX including the input field 73 in which a selectable destination button is arranged is set in the destination input region R3 as an initial screen is described.

In a state where the destination setting screen Da is displayed, the processor 31 receives various operation selections on a screen detected by the touch panel 45. When one destination is selected in the input field 73 of the destination input region R3 (ACT 13, YES), the processor 31 determines whether or not the selected destination is already registered (ACT 14).

When it is determined that a previously unregistered destination is selected (ACT 14, YES), the processor 31 indicates that the selected destination is registered (ACT 15). When the previously unregistered destination is selected, the processor 31 displays the previously unregistered destination as the registered destination in the destination display region R2 (ACT 16). For example, the processor 31 displays information indicating the selected destination in the registration field 61, and counts up the number of the destinations displayed in the display field 62.

When it is determined that a previously registered destination is selected (ACT 14, NO), the processor 31 deletes the registration of the destination. When the registration of the selected destination is deleted, the processor 31 indicates, in the destination display region R2, that the previously registered destination is not registered (not selected) (ACT 17). In addition, the processor 31 updates the destination display region R2 to a display that the previously registered destination is no longer registered (ACT 18). The processor 31 deletes the display of the destination in the registration field 61, and updates the number of destinations displayed in the display field 62.

In addition, the processor 31 detects a selection of each destination displayed in the registration field 61 by a detection signal of the touch panel 45 (ACT 19). When one destination displayed in the registration field 61 is selected (ACT 19, YES), the processor 31 updates the display of the input field 73 (ACT 20). The processor 31 changes a display position of each destination in the input field 73 such that the display position of the selected destination is at a predetermined position.

In addition, when a destination displayed in the registration field 61 is selected, the processor 31 displays a pop-up screen relating to the selected destination (ACT 21). The pop-up screen is an operation screen for displaying information relating to the selected destination, and selecting the change of state with respect to the selected destination at the same time. When the pop-up screen is displayed, the processor 31 receives an operation selection on the pop-up screen (ACT 22). For example, the processor 31 receives a delete selection of the destination on the pop-up screen displayed on the destination setting screen for FAX.

When the change of state is selected on the pop-up screen (ACT 22, YES), the processor 31 changes the state of the destination according to the selection (ACT 23). For example, when delete is selected on the pop-up screen, the processor changes a registered state of the destination to an unregistered state. In addition, when the closing of the pop-up screen is selected (ACT 24, YES), the processor 31 closes the pop-up screen, and displays the destination setting screen (ACT 25). When the pop-up screen is closed, the processor 31 displays the destination setting screen reflecting changes made in the pop-up screen.

In addition, the processor 31 receives the selection of screen update in the destination setting screen (ACT 26). When the selection of screen update is received (ACT 26, YES), the processor 31 updates the display of the destination setting screen according to the selection (ACT 27). For example, when selection states of tabs 71a to 71c are changed, the processor 31 changes the display screen of the input field 73. In addition, when a selection state of the selection buttons 72a and 72b is changed, the processor 31 changes a display format of the destination in the input field 73. In addition, when a selection state of a condition tab is changed, the processor 31 changes the destination displayed in the input field 73.

In addition, the processor 31 receives the transmission selection by a transmission button 86 on the destination setting screen (ACT 28). The processor 31 displays the transmission button 86 in a selectable state when at least one destination is set. When the transmission button 86 is selected (ACT 28, YES), the processor 31 performs processing for transmitting a FAX to the registered destination (ACT 29). For example, when the transmission button 86 is selected, the processor 31 starts immediately scanning and FAX transmission. In addition, the processor 31 may display a destination confirmation screen according to the selection of the transmission button 86. The processor 31 may start processing after confirmation of the displayed destination is selected. An operation of a case where the transmission button 86 is selected may be set by a user.

Next, email transmission processing in the MFP 1 will be described.

Figure 7:
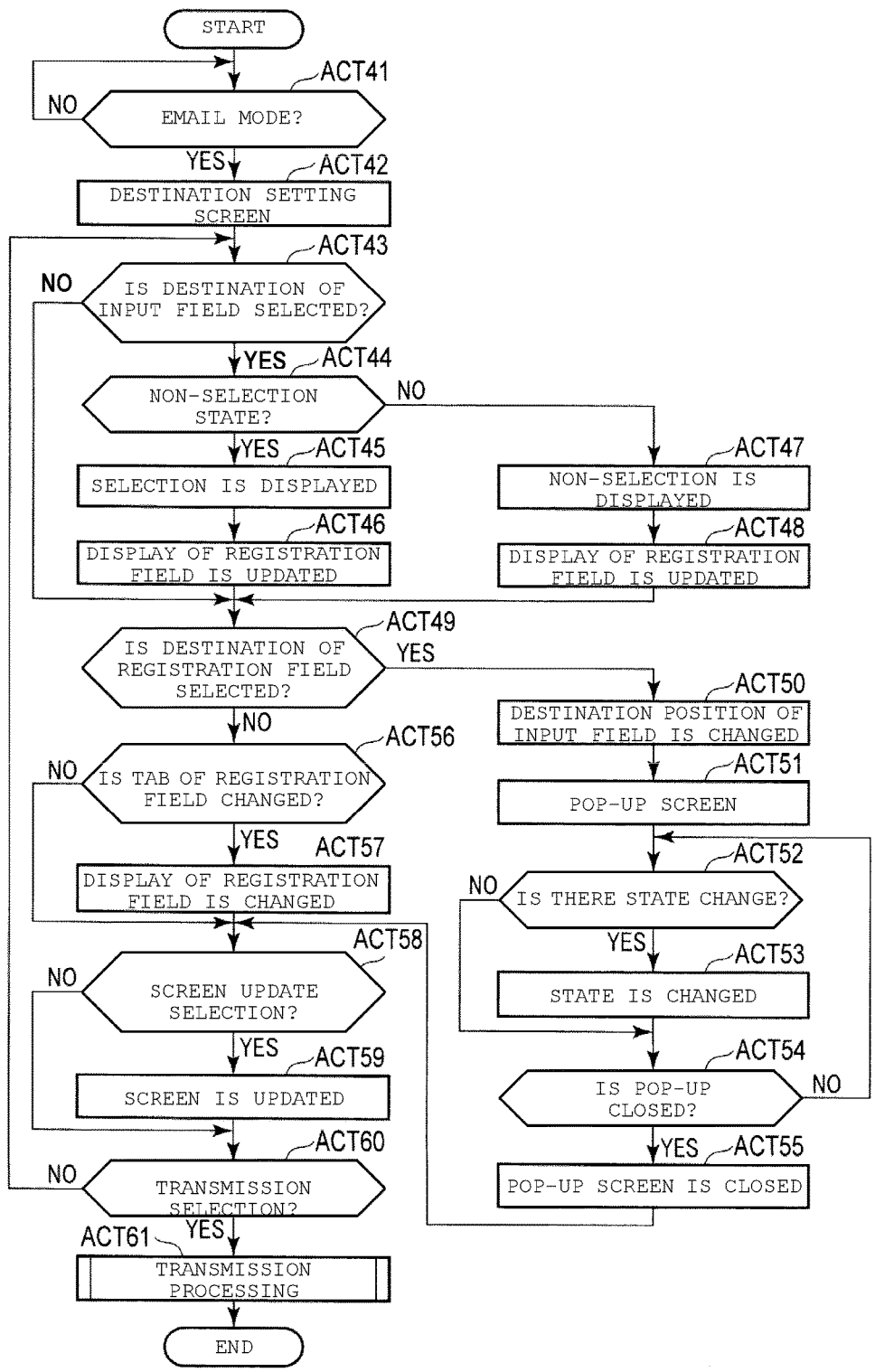
FIG. 7 is a flowchart illustrating an example sequence of operations for email transmission processing in the image processing device.

FIG. 7 is a flowchart illustrating an operation sequence of operations for including destination setting processing in the email transmission processing in the MFP 1.

The processor 31 of the system control unit 13 displays the main menu screen on the display unit 44 of the control panel 14, in a standby state. The main menu screen is the operation screen in which various processing modes including a scan mode can be selected. When the scan mode is designated, the processor 31 displays the scan menu on the display unit 44. For example, in the scan menu, any one of functions such as scan to email, scan to file, scan to e-Filing, scan to USB memory, and the like can be selected. The scan to email is a function for performing email transmission of an image that is scanned. The scan to file is a function for saving the image that is scanned in a file. The scan to e-Filing is a function for saving the image that is scanned in a memory within the MFP. The scan to USB memory is a function for saving the image that is scanned in an external memory connected to the external I/F 46. Hereinafter, an operation example that it is assumed that the scan to email is selected will be described.

When email transmission processing is selected (ACT 41, YES), the processor 31 displays the destination setting screen for setting an email destination on the display unit 44 (ACT 42). When destination setting of an email is performed, an initial screen is displayed first. Here, as an example, it is described that the destination setting screen Db for email including the input field 73 in which buttons of selectable destinations are displayed in the destination input region R3 is set as the initial screen.

In a state where the destination setting screen Db is displayed, the processor 31 receives various operation selections on a screen detected by the touch panel 45. When one destination is selected in the input field 73 of the destination input region R3 (ACT 43, YES), the processor 31 determines whether or not the selected destination is already registered (ACT 44).

When it is determined that a previously unregistered (not selected) destination is selected (ACT 44, YES), the processor 31 registers the selected destination. There are categories of To, Cc, and Bcc for the email destinations. The categories with respect to these destinations are selected by a tab of the destination display region R2. When an unregistered destination is selected in the input field 73, the processor 31 registers the selected destination in a category of a selected tab in the destination display region R2. For example, when the To tab 63a is selected in the destination display region R2, the processor 31 registers the selected destination as the To destination. In addition, when the Cc tab 63b is selected, the processor 31 registers the selected destination as the Cc destination. In addition, when the Bcc tab 63c is selected, the processor 31 registers the selected destination as the Bcc destination.

When the selected destination is registered, a state of the processor 31 indicates that the selected destination in the input field 73 is registered (ACT 45). In addition, the processor 31 updates the destination display region R2 to indicate that the selected destination is registered (ACT 46). The processor 31 displays the selected destination in the registration field 61, and updates the number of registered destinations in the display field 62. The selected destination is displayed in the registration field 61 as being registered in a category indicated by a tab that is selected. The total number of destinations registered in the category indicated by the selected tab is displayed in the display field 62.

In addition, when it is determined that a previously registered (selected) destination is selected (ACT 44, NO), the processor 31 deletes the registration of the selected destination, in a category of a tab in the selection state in the destination display region R2. For example, when the To tab 63a selected in the destination display region R2, the processor 31 deletes the selected destination from the To destination. In addition, when the Cc tab 63b is selected, the processor 31 deletes the selected destination from the Cc destination. In addition, when the Bcc tab 63c is selected, the processor 31 deletes the selected destination from the Bcc destination.

When the prior registration of the selected destination is deleted, the processor 31 indicates that the destination designated in the input field 73 is not registered (not selected) (ACT 47). In addition, the processor 31 updates the destination display region R2 to indicate that the registration of the selected destination is released (ACT 48). The processor 31 removes information indicating the selected destination from the display of the registration field 61, and updates the number of registered destinations displayed by the display field 62.

In addition, the processor 31 detects selections of each destination displayed in the registration field 61 by a detection signal on the touch panel 45 (ACT 49). When a destination displayed in the registration field 61 is selected (ACT 49, YES), the processor 31 updates a display position of the selected destination in the input field 73 (ACT 50). For example, the processor 31 changes the display position of each destination such that a display position of the selected destination is at a predetermined position. In addition, when a destination displayed in the registration field 61 is selected, the processor 31 displays a pop-up screen relating to the selected destination (ACT 51). The pop-up screen is an operation screen for displaying information relating to the selected destination, and selecting the change of state with respect to the selected destination at the same time. When the pop-up screen is displayed, the processor 31 receives an operation selection on the pop-up screen (ACT 22). The processor 31 receives selections of state change such as the change, deletion, or the like of a category of the destination on the pop-up screen displayed on the destination setting screen for email.

When the change of state on the pop-up screen is selected (ACT 52, YES), the processor 31 changes the state of destination according to a selection (ACT 53). For example, when the deletion is selected on the pop-up screen, the processor 31 releases the registration of the destination. In addition, when change to Cc is selected on the pop-up screen, the processor 31 changes the category to the Cc destination. When change to Bcc is selected on the pop-up screen, the processor 31 changes the category to the Bcc destination. When change to To is selected on the pop-up screen, the processor 31 changes the category to the To destination. In addition, when the closing of the pop-up screen is selected (ACT 54, YES), the processor 31 closes the pop-up screen (ACT 55), and displays the destination setting screen. In this case, the processor 31 displays the destination setting screen which reflects settings selected on the pop-up screen.

In addition, the processor 31 receives the selection of tabs 63a to 63c in the destination display region R2 on the destination setting screen (ACT 56). When the selection change of the tabs 63a to 63c, that is, a change selection of a category of a destination is received (ACT 56, YES), the processor 31 updates the display of destination in the display field 62 and the registration field 61 according to the selection (ACT 57). For example, when the display is changed to a selection state of the tab 63a (or 63b or 63c), the processor 31 displays the registered destination in the display field 62 and the registration field 61 as the To destination (or Cc or Bcc). In addition, when the display is changed to a selection state of the tab 63a (or 63b or 63c), the processor 31 displays the number of the registered destinations in the display field 62 as the To destination (or Cc or Bcc).

In addition, the processor 31 receives the selection of screen update on the destination setting screen (ACT 56). When the selection of screen update is received (ACT 58, YES), the processor 31 updates the display of the destination setting screen according to the selection (ACT 59). For example, when a selection state of tabs 71a to 71c is changed, the processor 31 changes the display screen in the input field 73. In addition, when a selection state of the selection buttons 72a and 72b is changed, the processor 31 changes the display format of destination in the input field 73. In addition, when a selection state of a condition tab is changed, the processor 31 changes a destination displayed in the input field 73.

In addition, the processor 31 receives the transmission selection by the transmission button 92 on the destination setting screen (ACT 60). The processor 31 displays the transmission button 92 in a selectable state when at least one destination is set in any one of the categories. When the transmission button 92 is selected (ACT 60, YES), the processor 31 performs processing for transmitting an email to the registered destination(s) (ACT 61). For example, when the transmission button 92 is selected, the processor 31 starts immediately scan and email transmission. In addition, the processor 31 may display the destination confirmation screen according to the selection of the transmission button 92. Then, the processor 31 may start processing after the confirmation of the displayed destination is selected. An operation of a case where the transmission button 92 is selected may be set by a user.

As described above, the image processing device according to the embodiment displays the destination setting screen including the registration field for displaying the registered (selected) destination and the input field for inputting the destination by a user on the display unit. In addition, the image processing device according to the embodiment indicates the registered destination in the input field. According to the embodiment, it is possible to provide a user interface with an excellent operability which can input a destination of FAX or email while confirming the registered destination.

In addition, the image processing device according to the embodiment displays the destination setting screen, in which the registration field is arranged in the left side region and the input field is arranged in the right side region on the screen, on the display unit. According to the embodiment, it is possible to provide a user interface with an excellent operability by performing an input operation by the right hand of user with respect to the input field.

In addition, the image processing device according to the embodiment receives a selection to the registered destination in the registration field, and moves a display position to a predetermined position in the input field of the destination selected in the registration field. Thus, the destination selected in the registration field can be easily confirmed in the input field, and then the operability of user in the input field is improved.

In addition, in the image processing device according to the embodiment, a tab key for designating a category of a destination ("To", "Cc", and "Bcc") is arranged in the vicinity of the registration field in the destination setting screen for setting the destination of email. Thus, it is possible for a user to easily confirm a category of a registration destination selected in the input field. In addition, it is possible for a user to easily confirm a destination that has been already registered as a desired category.

A program executed by a processor of the image processing device of the embodiment described above is provided by the program being recorded in a computer readable recording medium such as a CD-ROM, a flexible disk, a CD-R, a digital versatile disk (DVD), or the like as a file of a format which can be installed in a memory or an executable format. In addition, the program executed by the processor of the embodiment may be provided or distributed via a network such as the Internet or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein maybe made without departing from the spirit of the inventions. The accompanying claims and their equivalents are intended to cover such forms or modifications as would fall within the scope and spirit of the inventions.

What is claimed is:

1. An image processing device comprising:
a display device configured to display a FAX destination registration screen having: a destination registration region in which a plurality of registered FAX destinations are displayed in a list, and a destination input region in which a plurality of selectable FAX destinations are displayed;
an input device configured to:
receive a destination registration input with respect to the destination input region, the destination registration input indicating a selected FAX destination from the plurality of selectable FAX destinations,
receive a registered destination selection input with respect to the destination registration region, the registered destination selection input corresponding to a registered FAX destination from the plurality of registered FAX destinations, and
receive a transmission input; and
a processor configured to:
in response to receiving the destination registration input indicating the selected FAX destination, control the display device to update the destination registration region so that the selected FAX destination is added to the registered FAX destinations displayed in the list,
in response to receiving the registered destination selection input, control the display device to display a pop-up screen including: destination information regarding the registered FAX destination corresponding to the registered destination selection input, and a selectable clear button, and
in response to an input corresponding to the clear button, control the display device to update the destination registration region so that the registered FAX destination corresponding to the registered destination selection input is removed from the registered FAX destinations displayed in the list, and
in response to the transmission input, transmit an image to each registered FAX destination displayed in the list.

2. The device according to claim 1, wherein when one of the registered FAX destinations displayed on the destination registration region is selected, the processor controls the display unit to update the FAX destination registration screen so that the registered FAX destination corresponding to the selection is displayed at a predetermined position in the destination input region.

3. The device according to claim 1, wherein when the selected FAX destination indicated by the destination registration input is already displayed in the destination registration region, the processor controls the display device to update the destination registration region so that the selected FAX destination is removed from the destination registration region.

4. The device according to claim 1, wherein:
the input device is further configured to receive a display format input, and
the processor controls the display device to display the plurality of selectable FAX destinations as one of a grid and a list, based on the display format input.

5. An image processing device comprising:
a display device configured to display an email destination registration screen having: a destination registration region in which a plurality of registered email destinations are displayed in a list, and a destination input region in which a plurality of selectable email destinations are displayed;
an input device configured to:
receive a destination registration input with respect to the destination input region, the destination registration input indicating a selected email destination from the plurality of selectable email destinations,
receive a registered destination selection input with respect to the destination registration region, the registered destination selection input corresponding to a registered email destination from the plurality of registered email destinations, and
receive a transmission input; and
a processor configured to:
in response to receiving the destination registration input indicating the selected email destination, control the display device to update the destination registration region so that the selected email destination is added to the registered email destinations in the list,
in response to receiving the registered destination selection input, control the display device to display a pop-up screen including: destination information regarding the registered email destination corresponding to the registered destination selection input, and a selectable clear button, and
in response to an input corresponding to the clear button, control the display device to update the destination registration region so that the registered email destination corresponding to the registered destination selection input is removed from the registered email destinations in the list, and
in response to the transmission input, transmit an image to each registered email destination displayed in the list.

6. The device according to claim 5, wherein when one of the registered email destinations displayed on the destination registration region is selected, the processor controls the display unit to update the email destination registration screen so that the registered email destination corresponding to the selection is displayed at a predetermined position in the destination input region.

7. The device according to claim 5, wherein, when the selected email destination indicated by the destination registration input is already displayed in the destination registration region, the processor controls the display device to update the destination registration region so that the selected email destination is removed from the destination registration region.

8. The device according to claim 5, wherein:
the input device is further configured to receive a display format input, and
the processor controls the display device to display the plurality of selectable email destinations as one of a grid and a list, based on the display format input.

9. The device according to claim 5, wherein
the input device is further configured to receive a category display input indicating a selected category among the plurality of selectable email destination categories, and
in response to the category display input, the processor controls the display device to display only email destinations belonging to the selected category in the destination registration region.

10. The device according to claim 9, wherein the selectable email destination categories include To, Cc, and Bcc.

11. An image processing method comprising the steps of:
displaying an email destination registration screen having: a destination registration region in which a plurality of registered email destinations are displayed in a list, and a destination input region in which a plurality of selectable email destinations are displayed;
receiving a destination registration input with respect to the destination input region, the destination registration input indicating a selected email destination from the plurality of selectable email destinations;
receiving a registered destination selection input with respect to the destination registration region, the registered destination selection input corresponding to a registered email destination from the plurality of registered email destinations;
in response to receiving the destination registration input indicating the selected email destination, updating the destination registration region so that the selected email destination is added to the registered email destination in the list;
in response to the registered destination selection input, displaying a pop-up screen including: destination information regarding the email destination corresponding to the registered destination selection input, and a selectable clear button;
in response to an input corresponding to the clear button, updating the destination registration region so that the registered email destination corresponding to the registered email destination selection input is removed from the registered email destinations displayed in the list;
receiving a transmission input; and
in response to the transmission input, transmitting an image to each registered email destination in the list.

12. The method according to claim 11, further comprising the step of:
when one of the registered email destinations displayed on the destination registration region is selected, updating the email destination registration screen so that the registered email destination corresponding to the selection is displayed at a predetermined position in the destination input region.

13. The method according to claim 11, further comprising the steps of:
receiving the destination registration input with respect to an email destination already displayed in the destination registration region; and
in response to the destination registration input, updating the destination registration screen so that the selected email destination is removed from the destination registration region.

14. The method according to claim 11, further comprising the steps of:
receiving a display format input; and
in response to the display format input, displaying the plurality of selectable email destinations as one of a grid and a list, based on the display format input.

15. The method according to claim 11, further comprising the steps of:
receiving a category display input indicating a selected category among a plurality of selectable email destination categories; and
in response to the category display input, displaying only email destinations belonging to the selected category in the destination registration region.

16. The method according to claim 11, wherein the selectable email destination categories include To, Cc, and Bcc.

* * * * *